(No Model.) 2 Sheets—Sheet 1.

H. J. E. JENSEN.
FILTER.

No. 516,439. Patented Mar. 13, 1894.

Witnesses:
G. W. Rea
Robt Everett

Inventor:
Heinrich J. E. Jensen
By James L. Norris
Atty.

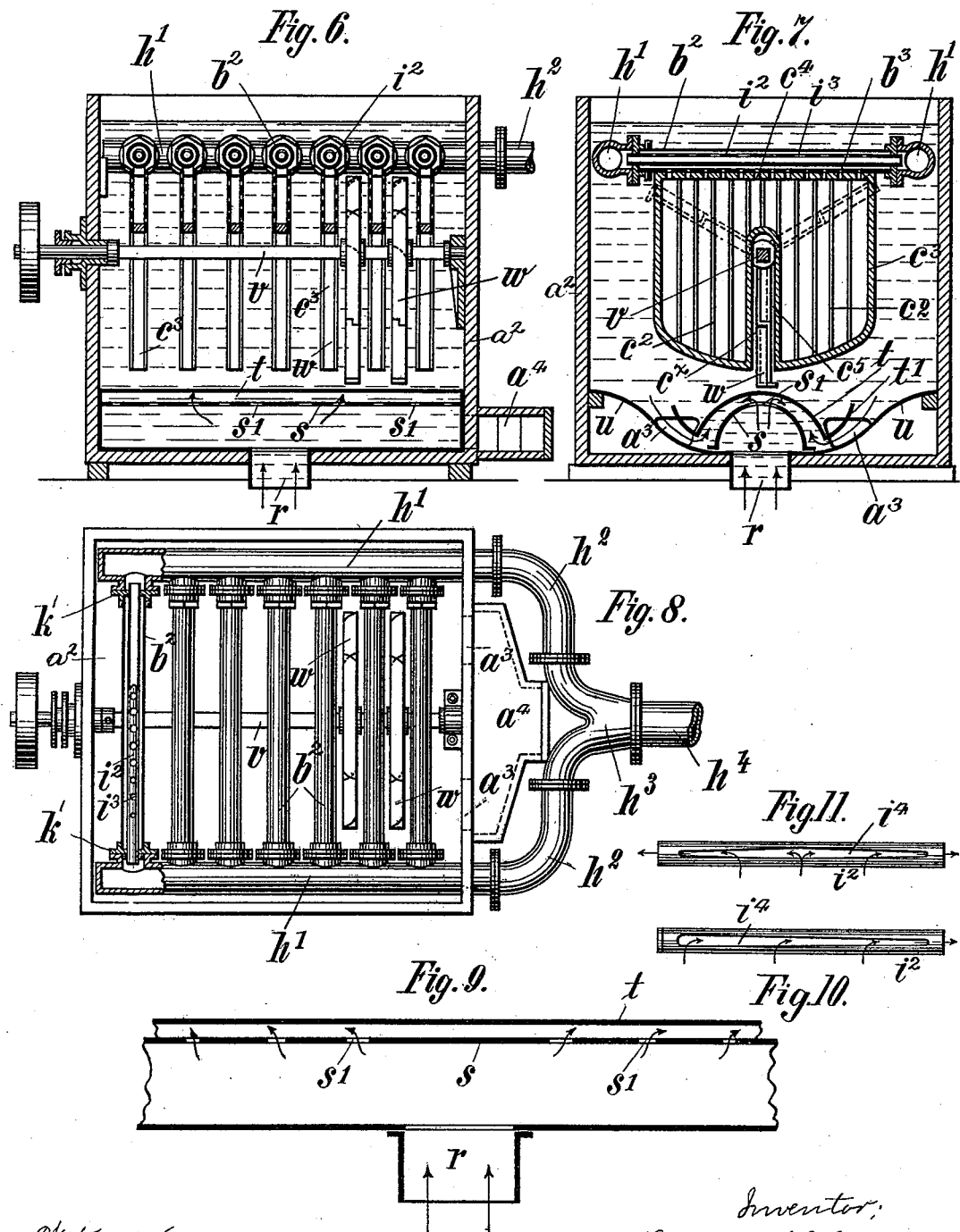

UNITED STATES PATENT OFFICE.

HEINRICH JÜRGEN ERNST JENSEN, OF HAMBURG, GERMANY.

FILTER.

SPECIFICATION forming part of Letters Patent No. 516,439, dated March 13, 1894.

Application filed February 20, 1893. Serial No. 463,110. (No model.)

*To all whom it may concern:*

Be it known that I, HEINRICH JÜRGEN ERNST JENSEN, a subject of the German Emperor, residing at Hamburg, in the German Empire, have invented certain new and useful Improvements in Filters, of which the following is a specification.

My invention relates to a filtering apparatus comprising filter cells or plates with layers of asbestus or cellulose serving as a filtering agent.

The object of this invention is to distribute the liquid to be purified over the whole filtering surface at disposal so as to prevent the filtering agent being partially washed from the several filtering surfaces.

In the accompanying drawings two constructional forms are represented of this improved filtering apparatus.

Figure 1:
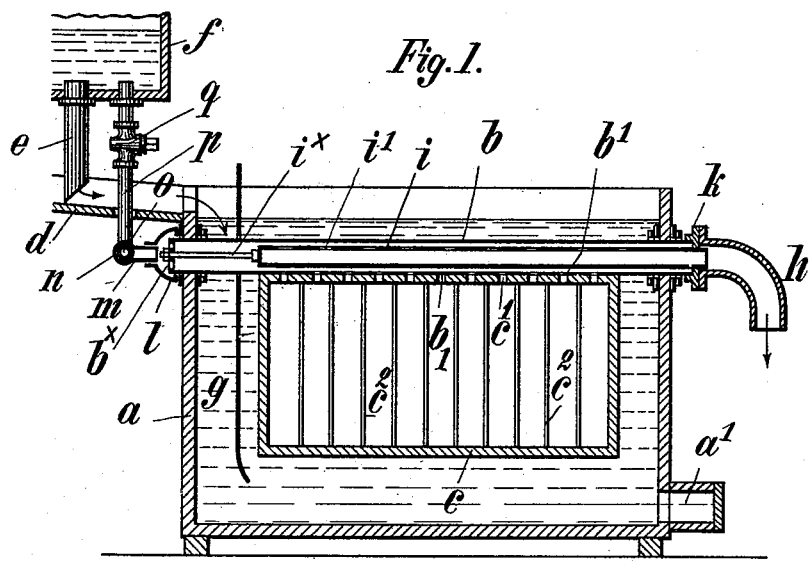
Figure 2:
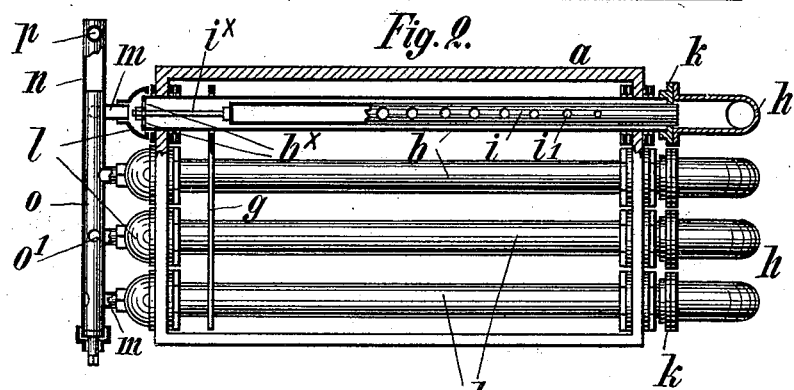
Figures 3, 4, 5:
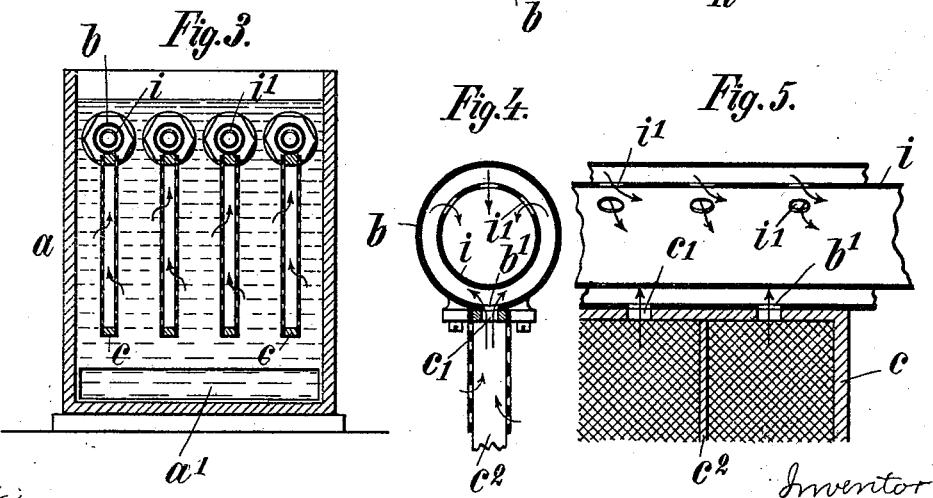

Figure 1 shows a vertical longitudinal section; Fig. 2 a plan and Fig. 3 a transverse section of one form of this apparatus. Figs. 4 and 5 are a transverse section and a longitudinal section of details of this arrangement. Fig. 6 illustrates a vertical longitudinal section; Fig. 7 a transverse section, and Fig. 8 a plan of the second form of the filtering apparatus. Fig. 9 shows details of this second arrangement. Figs. 10 and 11 show modifications of details.

In the arrangement shown in Figs. 1 to 3, $a$ designates an open vessel in which filter plates or cells $c$ are provided below horizontal tubes $b$, their interior communicating through apertures $c'$ $b'$ with the interior of these tubes $b$. The liquid to be purified coming from a reservoir $f$ flows over a channel $d$ into the vessel $a$, wherein it is compelled by a transverse partition $g$ which does not extend quite to the bottom of the said vessel to move from the bottom upward.

In order to utilize the layers of filtering material on the surface of the several cells in a uniform manner and thus prevent currents which would partially wash away the layers of cellulose or asbestus, and also to render possible a uniform deposition of such layers when the apparatus is set in operation, the outflow of the purified liquid is regulated in a peculiar manner. In each of the aforesaid tubes $b$ communicating with the cells $c$, and connected with an equal number of collecting or outlet tubes $h$, I provide a tube $i$ Figs. 1 to 5, which, extending the entire length of the cell $c$, leaves between itself and the outer tube $b$ an annular space shut off from the collecting or outlet tube $h$ by a disk. One end of the interior of each inner tube $i$ is in communication with a collecting or outlet tube $h$, but its other end is closed and supported by a central rod $i^x$ and a bridge-piece $b^x$ fastened to the outlet tube $b$. As each inner tube $i$ is provided with apertures $i'$ at its upper side, the outer tubes $b$ and also the cells $c$ suspended from the under side of these outer tubes communicate through the said apertures with the collecting or outlet tube $h$. The apertures $b'$, $c'$ establishing communication between the cells and outer tubes are of equal width and arranged at equal distances from each other, but the apertures $i'$ in the inner tube are so distributed that the sectional area for the admission of liquid to the inner tube $i$ decreases toward the said collecting or outlet tube $h$. If with apparatus of this kind the filtering surfaces are to be cleaned by a counter current I put the ends of the outer tubes $b$ which are opposite to the collecting or outlet tube $h$ in communication, through bells $l$ furnished with branch tubes $m$, with a tube $n$ which is common to all the cells and in the interior of which is arranged a tube $o$ acting like the plug of a cock. This tube $o$ in accordance with the number and the distance of the branch tubes $m$ has apertures $o'$ so arranged that the tube $n$ communicates with only one branch tube $m$ at a time. To the tube $n$ is joined a tube $p$ through which the liquid used for the washing is introduced under pressure. Such a filtering apparatus is operated in the following manner: When the lateral surfaces of the cells $c$ are to be covered with filtering material the latter is generally mixed in the reservoir $f$ with a portion of the liquid to be purified and the mixture is conducted through a tube $e$ adapted to be closed by a valve over the channel $d$ into the filtering vessel $a$. In consequence of the peculiar arrangement of the tubes $i$ and the siphon action caused by the collecting or outlet tubes $h$, the filtering material is uniformly deposited at all parts of the cells, the liquid moving at a constant velocity in the vessel, because the portions of the liquid passing into the inner tube $i$ in the vicinity of the collecting or outlet tubes $h$ are kept somewhat back by the decrease in the sectional area at this point, so that the portions of the liquid entering at remoter points gain time to unite with the others. If the layers of filtering material are to be cleaned by a counter current the tubes $h$ are closed, the tube $o$ being put in such a position after the opening of a cock $q$ included in the tube $p$ coming from the reservoir $f$, that the liquid used for the washing is conducted under pressure to one after the other of the tubes $b$, and the layer of filtering material is washed from the several filter plates.

In the modified arrangement of the apparatus shown in Figs. 6 to 8 the tubes $b^2$, and also the cells $c^3$ are arranged not in the longitudinal direction, but in the transverse direction of the vessel $a^2$. In this case the outlet of the filtered liquid takes place from the middle of the tubes $b^2$ toward both sides, to each of their two ends being joined a collecting tube $h'$ arranged in the longitudinal direction of the vessel $a^2$. The two collecting tubes communicate through bent tubular pieces $h^2$ and a T-piece $h^3$ with the outlet tube proper $h^4$ which is adapted to be closed. The tubes $i^2$ inserted into the outer tubes $b^2$ and held in disks $k'$ are in this instance provided with apertures $i^3$ decreasing in sectional area from the middle toward both sides, care being moreover taken that the number of these apertures $i^3$, shall, without interfering with the above mentioned relation, progressively diminish toward the outlet tube $h^4$. The apertures $b^3$, $c^4$ leading from the interior of the outlet tubes $b^2$ to the cells $c$ have also here everywhere the same sectional area. The introduction of the liquid to be purified takes place through a tube $r$ terminating in the middle of the bottom of the vessel $a^2$. In order that the liquid may not move directly upward I place over the orifice of the tube $r$ a cap $s$ arranged at the bottom of the vessel $a^2$ and which has the necessary apertures $s'$ at its upper side for distributing the liquid. A plate $t$ is arranged above the cap $s$, and this plate in transverse section forms an arc of a circle with the cavity downward and with the ends turned upward.

The guide surfaces $t'$ thus obtained form, in conjunction with the suitably shaped bottom $u$ of the vessel $a^2$, gradually increasing channels leading to the cells so that the liquid to be purified approaches these cells at a gradually diminishing velocity. The liquid used for the washing is let out through openings $a^3$ in the wall of the vessel which terminate in a common outlet pipe $a^4$.

In the arrangement represented in Figs. 6 to 8 the several cells $c^3$ are provided with a recess $c^5$ which is open below, in order to make room for a horizontal shaft $v$ arranged in the central plane of the vessel $a^2$. On this shaft I fix vanes $w$ between two neighboring cells $c^3$. Owing to the action of these vanes when the filtering apparatus is set in operation, the filtering fiber mixed with the liquid is distributed uniformly over the perforated surfaces of the cells $c^3$, or, when the cleaning is necessary, the layers of filtering material are washed from the perforated surfaces of the cells. To this end each separate vane is formed in such a manner that one half of its surface, which is nearest to the periphery, throws the liquid used for the washing to one side, while the other half, which is turned toward the rotary axis, throws the liquid to the other side, so that two opposite filtering surfaces will be acted upon at the same time. The form of the vanes is however based on the assumption that the surfaces of one vane are so placed relatively to that of the other vane as to enable all the layers of fiber deposited upon the filtering surfaces to be peeled off. The position of the vanes relatively to their axis is such that in their rotary movement in one direction they will throw the liquid used for the washing at an acute angle against the filtering surfaces and will thereby sever the layer of filtering material. By turning them in the opposite direction, which has to be done when putting on a fresh layer of filtering material, the said vanes act chiefly as stirrers and cause the filtering materials, which are placed in the liquid used for the washing, to float about.

Instead of providing the tubes $i^2$ with apertures $i^3$ I may also form them with one or more slots $i^4$ Figs. 10 and 11, decreasing in width from one end toward the other or from the middle to both ends.

What I claim is—

1. In a filter, the combination with a filtering cell, and a vessel receiving the same, of a collecting tube $b$ carrying at its under side the filtering cell $c$ and communicating with the interior of the cell through a series of apertures $b'$, $c'$ of equal width, and a discharge pipe $i$ leading to the outlet tube or tubes of the filter and provided in its periphery with passages for the liquid, said discharge pipe being held within the collecting tube to leave an annular space between them, and the sectional area of the said passages being designed to decrease toward the said outlet tube or tubes, substantially as and for the purpose set forth.

2. In a filter, the combination with a vessel of a collecting tube one or more filtering cells, each of which is suspended from the under side of the collecting tube within the vessel, an inlet pipe $r$ and a convex cap $s$ arranged at the bottom of the said vessel, and a convex plate $t$ arranged above said cap and which in transverse section forms an arc of a circle of a greater radius than the radius of the convex plate $s$, the concave side of the plate $t$ being arranged downward, and having its edges turned upward, substantially as described.

In testimony that I claim the foregoing as my invention I have signed my name, in presence of two witnesses, this 7th day of January, 1893.

HEINRICH JÜRGEN ERNST JENSEN.

Witnesses:
ALEXANDER SPECHT,
DIEDRICH PETERSEN.